United States Patent [19]

Ivy

[11] 4,392,060
[45] Jul. 5, 1983

[54] WIND AND WATER POWER GENERATOR

[76] Inventor: Jessie T. Ivy, 686 W. Shore Dr., Anacortes, Wash. 98221

[21] Appl. No.: 201,343

[22] Filed: Oct. 27, 1980

[51] Int. Cl.³ .............................................. F03B 13/12
[52] U.S. Cl. ........................................ 290/53; 60/507
[58] Field of Search ...................... 290/42, 43, 53, 54; 60/493, 499, 500, 501, 504, 505, 506, 507; 417/330-333, 337; 416/84-86; 415/7

[56] References Cited

U.S. PATENT DOCUMENTS

| | | | |
|---|---|---|---|
| 1,109,839 | 9/1914 | Henry | 415/7 |
| 1,485,574 | 3/1924 | Viora | 60/506 |
| 3,604,942 | 9/1971 | Nelson | 290/54 |
| 3,746,875 | 7/1973 | Donatelli | 290/42 |
| 3,965,365 | 6/1976 | Parr | 290/53 |
| 3,988,592 | 10/1976 | Porter | 417/330 |
| 4,009,395 | 2/1977 | Long et al. | 60/506 |
| 4,206,601 | 6/1980 | Eberle | 60/497 |
| 4,228,360 | 10/1980 | Navarro | 290/43 |

Primary Examiner—J. V. Truhe
Assistant Examiner—Shelley Wade
Attorney, Agent, or Firm—Seed, Berry, Vernon & Baynham

[57] ABSTRACT

A wave-operated generator system utilizes flotation means for coupling the vertical movement of waves to an electrical generator using a rack and pinion assembly. Ratcheted pairs of gears convert the upward and the downward movement of the flotation means to unidirectional rotation. Supplemental generating systems which convert air and water current into electrical energy are used in conjunction with the wave-operated generator system.

1 Claim, 13 Drawing Figures

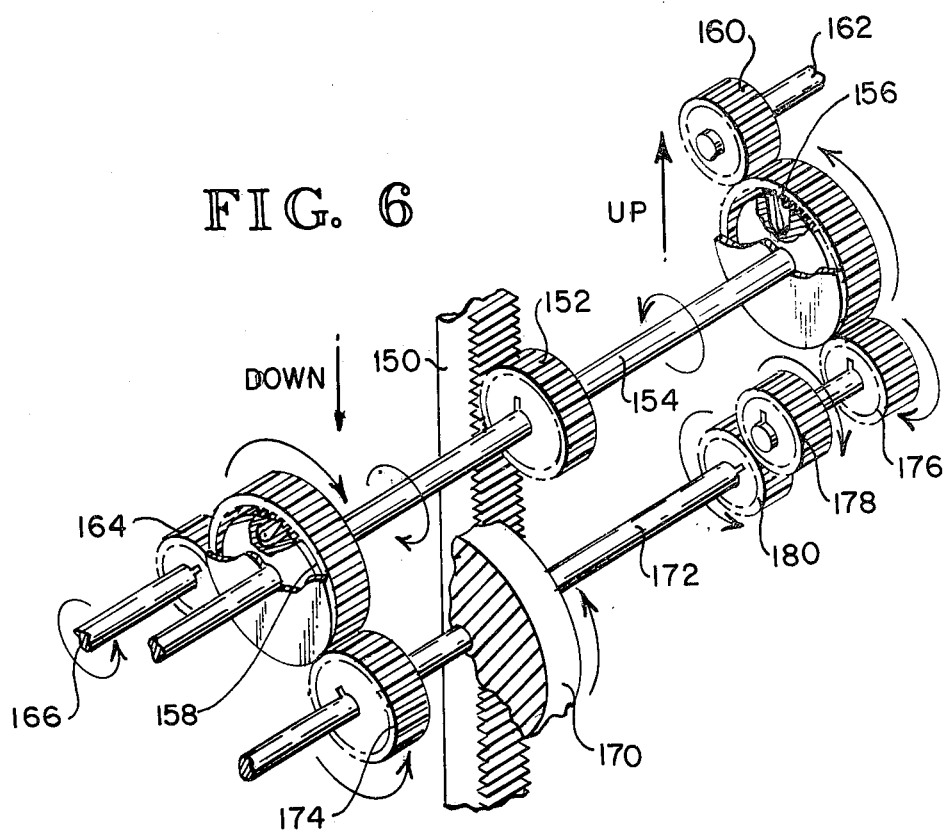
FIG. 6
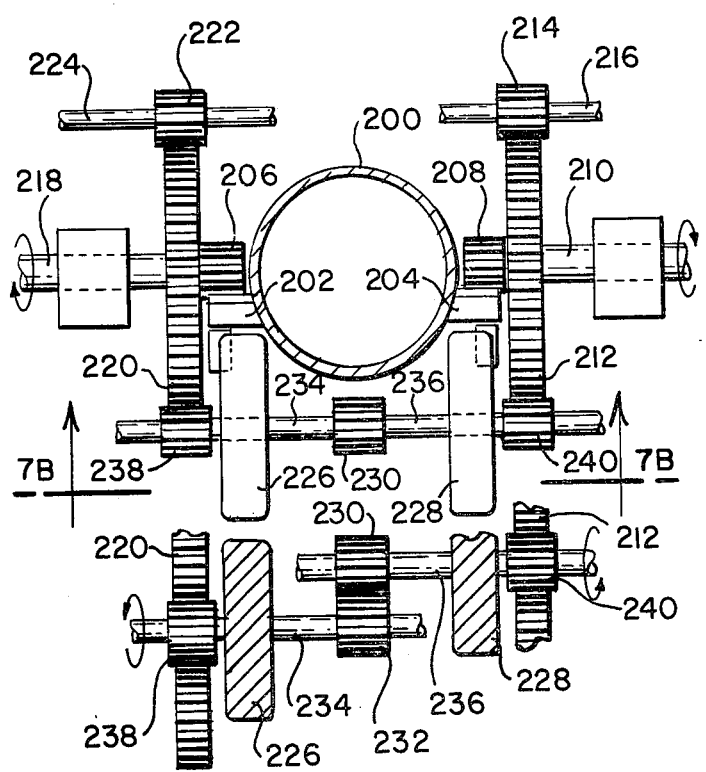
FIG. 7A
FIG. 7B

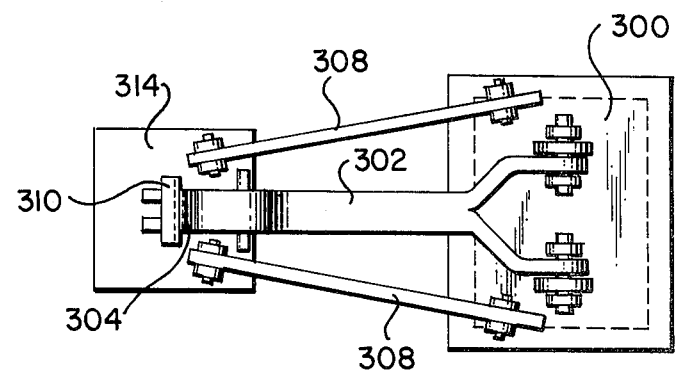
FIG. 8A
FIG. 8B
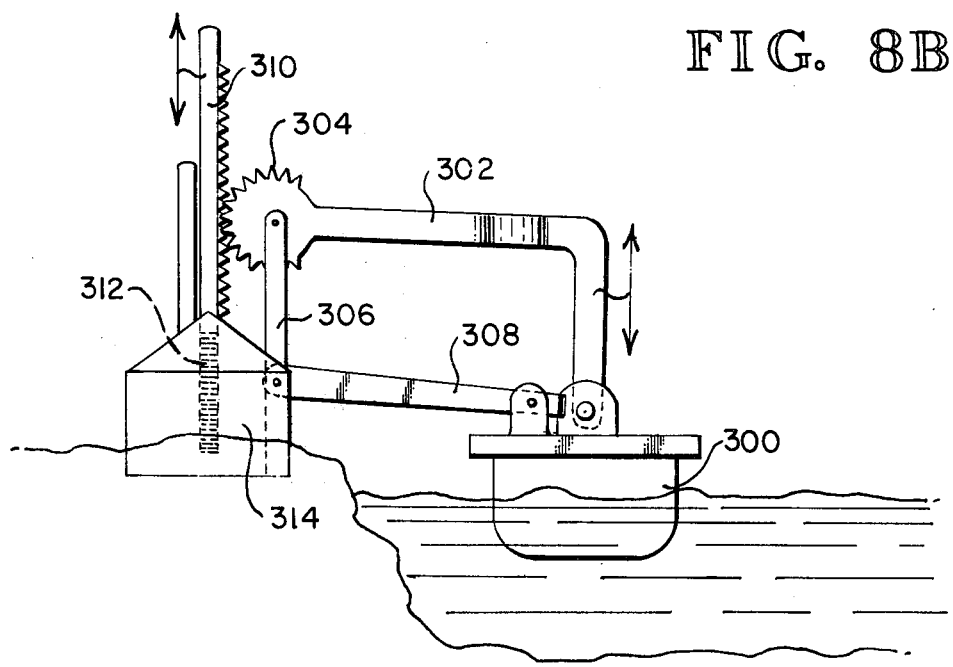
FIG. 8C
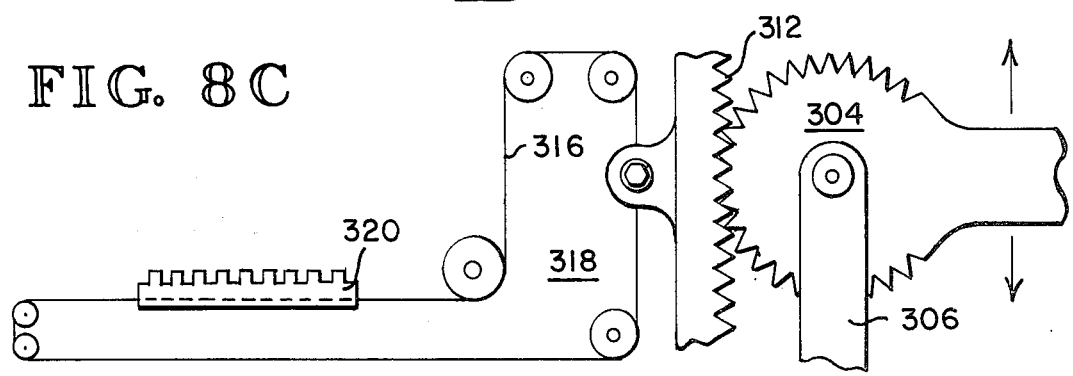

4,392,060

WIND AND WATER POWER GENERATOR

BACKGROUND OF THE INVENTION

1. Field of the Invention

This invention relates to a system for operating electrical generators which utilizes rack and pinion couplings operated by flotation means responsive to the rise and fall of the surface of a body of water. Ratcheted gear assemblies are utilized in some embodiments of the invention.

2. Prior Art Related to the Disclosure

Apparatus for harnessing naturally occurring energy sources, such as waves, currents, and winds, have found only limited development by the technologically advanced societies, probably because of the availability of relatively abundant and inexpensive fossil fuels. With the diminishing availability of such fuels and their consequent increase in cost, alternative energy sources are now being developed to harness replenishable, naturally occurring energy sources.

SUMMARY OF THE INVENTION

A novel feature of this invention provides a system for harnessing naturally occurring energy provided by wave motion on a body of water and also for harnessing tide and wind currents to generate electrical energy. A wave-operated generator system preferably includes a vertically extending support member. A float is coupled to the support for vertical movement with the waves. A rack and gear assembly is coupled between the float and the electrical generator to convert the vertical motion of the float to rotary motion for the electrical generator. The rack and gear assembly includes a rack comprising a bar with teeth on one face for engaging gear teeth and ratcheted pairs of gears which respectively convert the upward or downward motion of the waves to unidirectional rotary motion. In one embodiment of the invention, the rack is fixed to the vertically extending support member and various combinations of ratcheted gears are provided to couple the linear motion of the platform to rotary motion for the generator. In another embodiment of the invention, a linkage is provided between the flotation means and a movable rack. Remote operation of the generator is provided using cable means for transmitting linear motion of the movable rack to a remote generating site. A windmill and a tidemill may also be connected to the same generator station, thus combining three stations into a single unit.

BRIEF DESCRIPTION OF THE DRAWINGS

FIG. 6 is an alternative rack and gear arrangement;

FIG. 7A is a sectional plan view of another alternative rack and gear arrangement;

FIG. 7B is a partial elevation view of the arrangement of FIG. 7A;

FIG. 8A is a plan view of another alternative embodiment of a wave-operated system;

FIG. 8B is an elevation view of the system of FIG. 8A; and

FIG. 8C shows a cable arrangement for remotely positioning a ratcheted gear assembly of the type shown in FIGS. 8A and 8B.

DETAILED DESCRIPTION OF THE PREFERRED EMBODIMENTS

Figure 1:
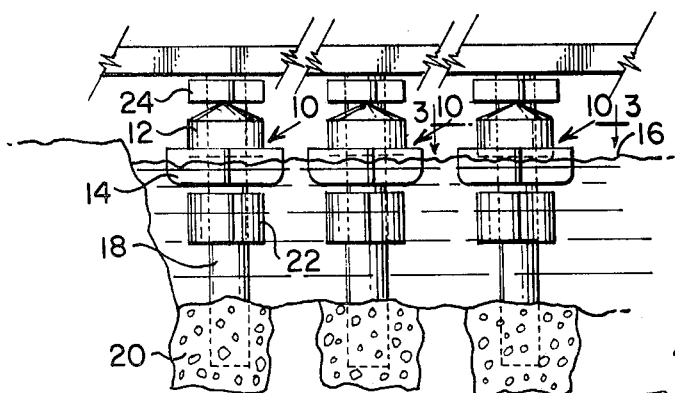
FIG. 1 is an elevation view of a preferred wave-operated generator system also having wind and current energy extraction subsystems.

Referring now to FIG. 1, a plurality of wave-operated generator systems 10 are shown which not only take advantage of the energy associated with wave motion, but also utilize tide and wind energy. A preferred float 14 and housing 12, which contains electrical generating means, rise and fall as the water level 16 changes. The float 14 and housing 12 are preferably mounted for vertical movement on a substantially vertical support 18, which is preferably embedded at one end in concrete 20 in the floor of the body of water. Conveniently, this support 18 may be a bridge column or other similar column. The wave-operated generator 10 may, of course, also be suspended from a structure located above the water surface. Preferably coupled to the lower end of the generator 10 is a tidemill 22. A windmill 24 may be positioned on the housing 12 above the float 14. These devices are intended to convert the energy of the various water and wind motions to electrical energy.

Figure 2A:
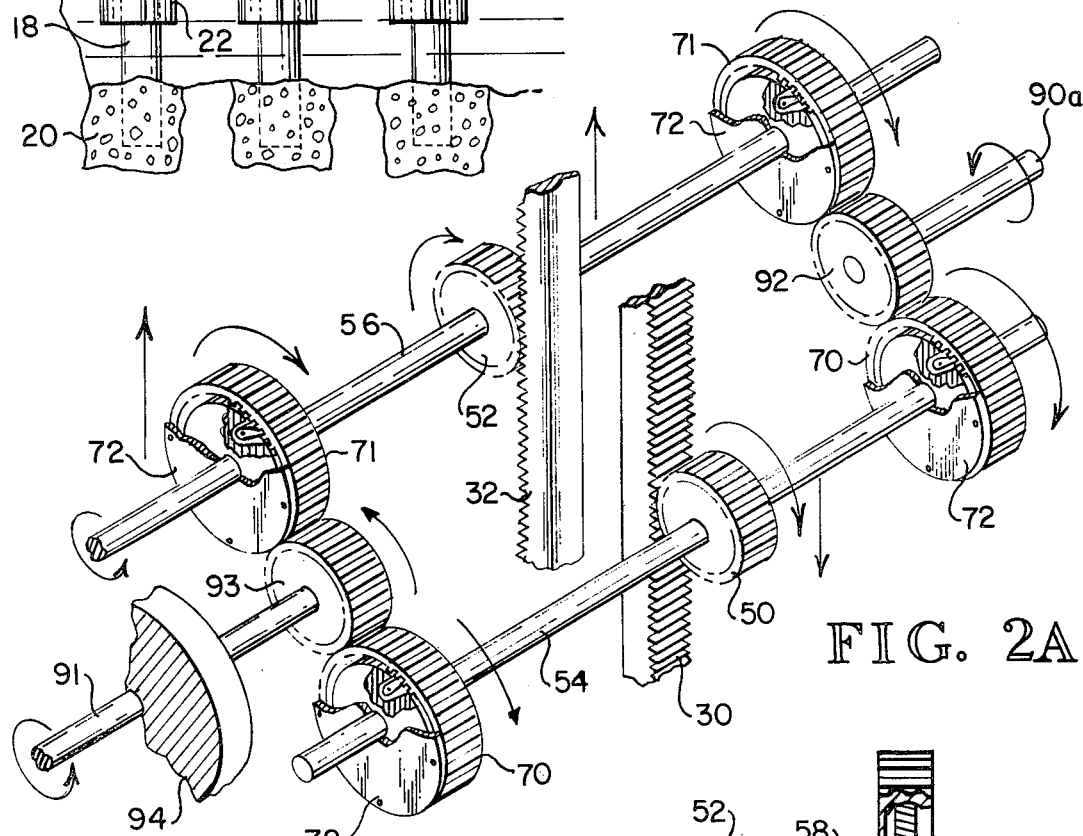
FIG. 2A is a detailed, isometric view of a portion of the rack and gear assembly according to the preferred invention.
Figure 3:
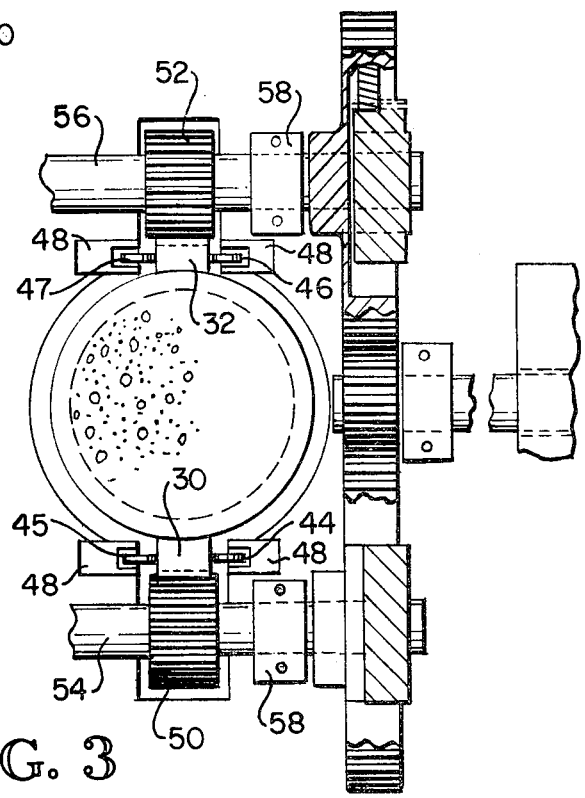
FIG. 3 is a sectional view of the rack and gear assembly taken along section line 3—3 of FIG. 1.
Figure 5:
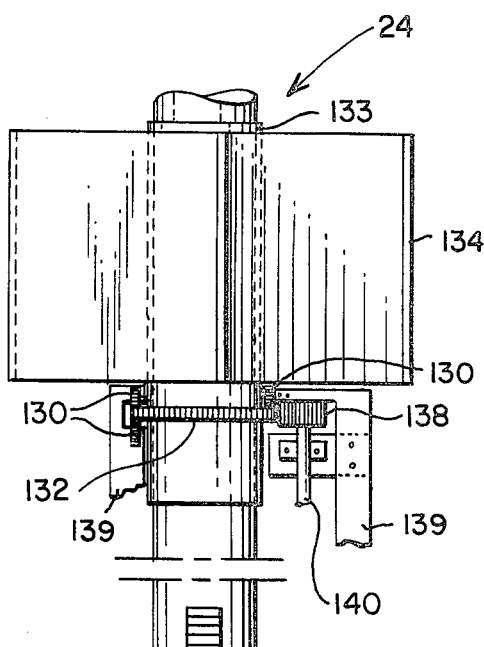
FIG. 5 is an elevation view, with the gears removed, of a wave-operated generator system also incorporating wind and water turbines.
Figure 5:
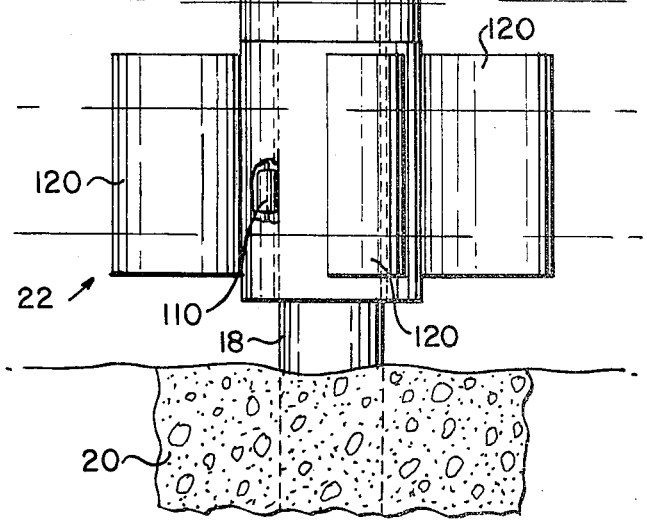

Referring to FIGS. 2A and 3, one embodiment of a rack and gear assembly for coupling the wave motion to a generator is shown. A cylindrical support 18 has a pair of racks 30, 32 fixed approximately 180° apart. The racks 30, 32 may be inlayed into the support 18 when mounted to minimize the clearance necessary between the flotation segments 90 and the support 18. The float 14 supports a platform 40, such as shown in FIG. 5, which includes a deck portion 42 for mounting various components of the system. The platform 40 is guided in its movement along the support 18 by four flanges 44, 45, 46, 47 which laterally extend, two from each rack 30, 32. Each flange slidably engages correspondingly formed guide slots formed in bearing blocks 48 fastened to a support structure above platform deck 42. The flanges and bearing blocks maintain the deck 42 in a substantially constant orientation to the support 18 as it moves along the support 18 in response to wave and tide variations in the water level 16. Each rack 30, 32 is respectively engaged by a pinion gear 50, 52. Each pinion gear 50, 52 is fixed to a respective shaft 54, 56 rotatably mounted above the platform 40 by suitable bearing assemblies 58.

Figure 2B:
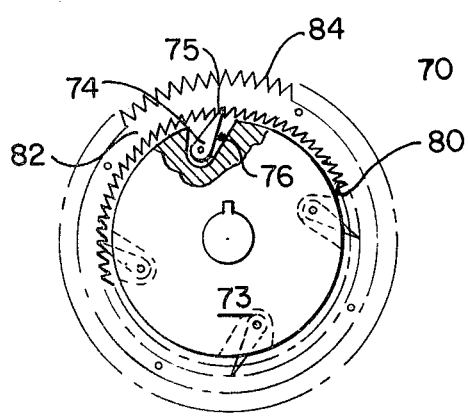
FIG. 2B is an exploded, isometric view of a ratcheted gear.

FIG. 2A shows a plurality of ratchet gear assemblies 70, 71, each attached near the ends of the shafts 54, 56. FIG. 2B shows the details of a typical ratchet gear assembly 70. Cover plates 72 cover both sides of a cylindrical center portion 73 keyed to the shaft. Ratchet levers 74 are pivotally connected in recesses formed in the external surface of the cylindrical center portion 73. The free ends 75 of the ratchet levers 74 are biased outwardly by a compression spring 76 such that each free end 75 obliquely engages a series of internal teeth 80 formed in a gear ring 82 which rotates on the cylindrical center portion 73 and which has external gear teeth 84. When the cylindrical center portion 73 is rotated in one direction, the end of the ratchet lever 74 engages the internal teeth to cause the gear ring 82 to rotate in the same direction. When the cylindrical center portion 73 is rotated in the opposite direction, the free end 75 of the ratchet lever 74 slips over the internal teeth so that the cylindrical center portion 73 rotates freely of the gear ring 82, thus providing a one-way, ratcheted operation of the ratchet gear assembly 70. Rotatably mounted above the deck 42, a pair of generator drive shafts 90a, 91 have respective generator gears 92, 93 fixed to one end for engagement with the ratchet gears 70, 71. The ratchet gears 70 are arranged such that when the pinion gear 50 moves downwardly on the rack 30, the ratchet gear assemblies 70 are engaged and operate the generator gears 92, 93 to turn the respective generator shafts 90a, 91. When the pinion gear 50 moves downward, the ratchet gear assemblies 71 are not engaged and transmit no power to the generator gears 92, 93. Conversely, when pinion gear 52 moves upwardly along the rack 32, the ratchet gear assemblies 71 provide power to the generator gears 92, 93, while the ratchet gear assemblies 70 slip. This feature permits the generator gears 92, 93 to be rotated in one direction as the pinion gears 50, 52 mounted above the platform 40 move up and down with the platform in response to wave motion. A flywheel 94 is partially shown fixed to the generator shaft 91 to smooth the variations in power applied to the generator shaft 91 through the ratchet gear assemblies 70, 71.

Figure 4A:
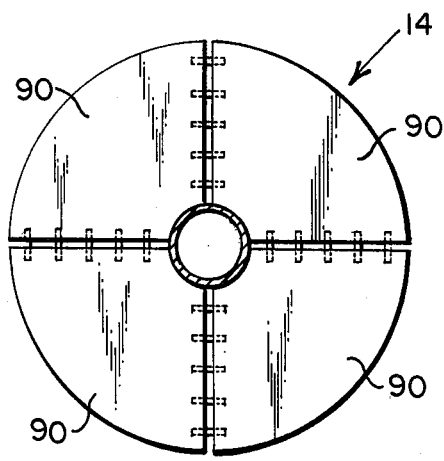
FIG. 4A is a plan view of a preferred float device.
Figure 4B:
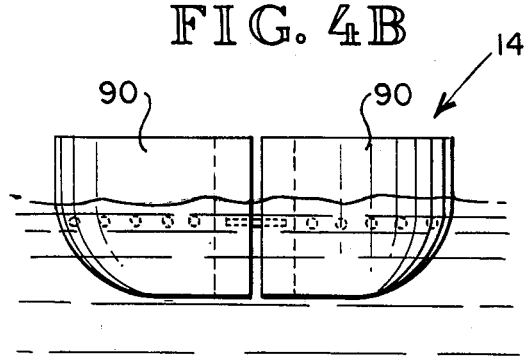
FIG. 4B is an elevation view of the float.

Referring to FIGS. 4A, 4B, a float 14 is shown formed of a plurality of individual flotation segments 90. The flotation segments are formed, for example, from closed-cell styrofoam or similar material. The lower surfaces of each of the flotation segments 90 are contoured and a central aperture is formed in the assembled float 14 for clearance of the hollow cylindrical tube 100 described above.

FIG. 5 shows the tidemill 22 mounted for rotation about the lower end of the support 18 and the windmill 24 mounted for rotation near the top of the support 18. The tidemill 22 preferably includes a hollow cylindrical tube 100 which has a large external-toothed gear 102 fixed near its top end for engagement with a pinion fixed to another generator shaft 106. The hollow cylindrical tube 100 rotates freely about the support 18 on a plurality of rollers 110 which are mounted to the hollow cylindrical tube 100. A plurality of curved blades 120 are pivotally mounted in a spaced-apart relationship around the lower portion of the hollow cylindrical tube 100 such that water current causes each of the curved blades 120 to be moved to an open position radially extending from the cylindrical tube 100. As each of the blades 120 is moved against the current, each blade is moved to a closed position against the hollow cylindrical tube 100, reducing resistance. Preferably, the blades are turbine fins to promote optimal power generation.

The windmill 24, shown in FIG. 5, is preferably comprised of a plurality of blades 134 which project outwardly from a hollow cylindrical tube 133 which is fitted to permit free rotation about the support 18. The windmill 24 is supported by support frames 139 which ascend from the platform 40. A plurality of rollers 130 mounted on the support frames 139 rollably engage the top and bottom surfaces of a ring gear 132 which is fixed to the external surface of the hollow cylindrical tube 133 to provide vertical support while permitting rotation of the wind-propelled vane assembly 24. A pinion 138 engages the ring gear 132 and drives a generator shaft 140. As the platform 40 is moved along the support 18, the water-current turbine assembly 22 and the windmill 24, mounted to the platform 40, move along the length of the support 18. Uncoupling the three devices with drives in the support is also possible. Splined, telescoping support means may also be used.

FIG. 6 shows an alternative rack and gear assembly for coupling wave motion to electrical generators. A single rack 150 is engaged by a pinion gear 152 fixed to a shaft 154 rotatably mounted above the platform. When the gear 152 moves upwardly with respect to the rack 150, the shaft 154 is turned in the direction as indicated by the "UP" arrow, which causes the ratchet gear assembly 156 to turn a pinion 160 connected to a generator shaft 162. In a similar manner, as the gear 152 moves downwardly along the rack 150, the shaft 154 is rotated in the direction as indicated by the "DOWN" arrow so that the ratchet gear assembly 158 is engaged to operate the pinion 164 connected to the generator shaft 166. A flywheel 170 stores and delivers energy to the ratchet gear assemblies 156, 158 when they are not being driven by the rack 150 and gear 152. The flywheel 170 is mounted on a shaft 172 rotatably fixed above the platform 40, and power is coupled to the flywheel 170 from the ratchet gear assembly 158 through the gear 174. Power is also coupled to the flywheel 170 through a gear 176 which engages the ratchet gear assembly 156 utilizing a pair of gears 178, 180 for reversing the direction of rotation. The gears 174, 176 transmit drive power from one ratchet gear assembly to the other ratchet gear assembly so that both generator shafts 162, 166 are driven during both up and down motion of the platform.

FIGS. 7A and 7B show another alternative embodiment of a rack and gear assembly for coupling vertical wave motion to rotary electrical generators. A support column 200 has gear racks 202, 204 mounted thereto which respectively engage gears 206, 208 mounted on shafts 218, 210. A pair of ratcheted gear assemblies 212, 220 are mounted to the output shafts 210, 218. Pinions 214, 222 are respectively engaged by the ratcheted gear assemblies 212, 220 to drive generator shafts 216, 224. A pair of flywheels 226, 228 are each mounted on shafts 234, 236, driven by pinions 238, 240 from the respective ratchet gear assemblies 220, 212. The shafts 234, 236 are coupled together by the vertically aligned gears 230, 232. The intertia of the flywheel 226, 228 provides energy to the ratchet gears 220, 212 in the absence of energy being supplied to the ratchet gear assemblies 220, 212 by movement vertically with respect to the column 200, and power is coupled between the ratchet gear assemblies by the pinions 238, 240 using the gears 230, 232 and the shafts 234, 236, thus steadying rotation of the drive generator shafts 216, 224 between upward and downward motion of the float 14.

FIGS. 8A, 8B and 8C show another embodiment of a wave-operated system for generating electrical power. A float 300 is positioned remotely from the location of the rack and ratcheted gear assembly using an actuator arm 302 which is pivotably connected at one end to the float 300. The other end of the actuator arm is connected to a pinion gear 304 and to a support member 306. A pair of stabilizing members 308 extend from the support member 306 to the float assembly 300 and are pinned at each end to accommodate vertical motion of the float assembly 300. As the float assembly 300 rises and falls on the surface of the water, the pinion 304 engages and operates a movable rack 310. The movable rack 310 has a second rack portion 312 which is engaged by ratcheted gear assemblies similar to those described hereinabove, which are enclosed in a gear assembly housing 314.

FIG. 8C shows an arrangement to accommodate remote positioning of a ratcheted gear assembly. The pinion 304 portion of the float assembly engages a vertically movable rack 312. A cable and roller assembly 318 provides a flexible power-transmitting means for transmitting the movement of the rack 312 to another rack 320 which is remotely located and which more conveniently operates a ratcheted gear assembly of the type described above.

While particular embodiments of the invention have been shown and described, it should be understood that the invention is not limited thereto since many modifications may be made. It is therefore contemplated to cover by the present application any and all such modifications which fall within the true spirit and scope of the basic underlying principles disclosed and claimed herein.

I claim:

1. An apparatus for generating electricity from the power of tides and waves in a body of water, comprising:
   a support affixed to the ground near the shore of a body of water;
   a float in the body of water capable of reciprocal motion under the action of waves and tides;
   a rigid actuator arm coupling the motion of the float to the support;
   an electrical generator operatively associated with the float and support;
   a rack and gear assembly coupled between the support and the generator and capable of converting the reciprocal motion of the float both upwardly and downwardly into electrical energy;
   wherein the support has a movable rack which is coupled to a pinion gear on the rigid actuator arm and wherein the movable rack is coupled through a cable and roller assembly to two ratcheted pairs of gears, so that one pair of gears operates the generator in response to upward movement of the float and the other pair operates the generator in response to downward movement of the float.

* * * * *